Patented Oct. 23, 1928.

1,688,822

UNITED STATES PATENT OFFICE.

JOHN MAXWELL, PHILIP C. HOFFMANN, AND CLARENCE E. McCOY, OF RICHMOND, VIRGINIA, ASSIGNORS, BY MESNE ASSIGNMENTS, TO VIRGINIA-CAROLINA CHEMICAL CORPORATION, OF RICHMOND, VIRGINIA, A CORPORATION OF VIRGINIA.

PROCESS OF PREPARING PURIFIED PHOSPHORIC ACID.

No Drawing.   Application filed December 22, 1925.   Serial No. 77,118.

The present invention relates to the production of purified phosphoric acid in its various forms, including the orthophosphoric acid, metaphosphoric acid and phosphoric anhydride, in a highly economical manner, and in a relatively pure state.

The principal sources of phosphoric acid are bones and phosphate rock, the latter including minerals which consist largely or essentially of tri-calcium phosphate. There are two commercial methods now employed in the extraction of phosphoric acid from such raw materials. These are the sulphuric acid method and the volatilization method. Of these two, the sulphuric acid method is the oldest and best known up to the present time. This method consists in treating the phosphate material with sulphuric acid in such an amount as to convert practically all of the calcium compounds present into calcium sulphate, which is substantially insoluble and at the same time forming orthophosphoric acid. The volatilization method produces a better grade of phosphoric acid, that is to say produces phosphoric acid containing generally less impurities than the sulphuric method and the acid produced by the volatilization method can be made more nearly water white in color than phosphoric produced by the sulphuric method. While the phosphoric acid made from phosphatic material by the well-known volatilization method is relatively pure as compared to that made by the sulphuric acid method, it, nevertheless, requires additional chemical treatment to make it sufficiently pure for use in making food products.

The sulphuric acid method first produces a crude orthophosphoric acid which may contain impurities found in the phosphate rock or in the sulphuric acid used, such as calcium, iron, aluminum, magnesium, chlorine, fluorine, organic matter, chromium, lead, arsenic and sometimes others. In view of the considerable amount of impurities present in this crude phosphoric acid, the purification thereof by chemical methods known up to the present time is quite expensive. The degree of purity of phosphoric acid made by the sulphuric method may vary considerably depending upon the character of the crude phosphatic materials used, such as crude Florida hard phosphate rock or pebble rock, South Carolina rock, Tennessee rock or other phosphate rock, or other phosphatic material.

In accordance with the present invention, it is proposed to produce a crude phosphoric acid by the well known sulphuric acid method, and to purify this phosphoric acid by volatilization, to separate the same from the major part at least of the impurities present. In accordance with the indirect volatilization method of purification herein described, it is readily possible to produce a water-white phosphoric acid which shall be practically free from all of the impurities above referred to except arsenic, lead, a small amount of organic matter, and possibly fluorine, these being subsequently eliminated by chemical treatment, in the same manner for example which is now commonly used in purifying the crude phosphoric acid produced by the methods hitherto commonly used.

If crude phosphoric acid is placed in a crucible and heated to a cherry red heat, a cloud of vapor immediately comes off, with both free water and water of chemical combination of the phosphocir acid, but at the temperature stated, there is finally left in the bottom of the crucible a gummy mass which is practically inert at this temperature, and which contains about 85% of the total phosphoric acid treated. If, however, an orange heat is applied to the crucible under the same conditions as above, about 25% of the phosphoric acid may be volatilized, and the rest remain in the crucible. If the crucible is heated to a yellow heat, substantially the same conditions as above will exist, except that about 50% of the total phosphoric acid will be volatilized. If the temperature is heated to a light yellow temperature, as much as 75% of the phosphoric acid may be volatilized, and if heated to a white heat, as much as 90% or even more of the phosphoric acid can be volatilized. It will be understood that by passing the fumes through a suitable condenser, the phosphoric acid volatilized in each of the above cases can be condensed and collected.

In all of the above instances, the heating operation is conducted while the phosphoric acid is subjected to substantially atmospheric pressure. The yields can be very slightly increased if there is a slight suction applied at the outlet, air being allowed to enter the crucible.

Substantially the same conditions exist if a retort is employed, for the volatilization or heating step, and a slow current of air is passed through the same, under substantially atmospheric pressure.

In the preferred mode of operation in accordance with the present invention, a furnace or other suitable apparatus is filled with coke, and by means of an air blast the coke is maintained at substantially a white heat.

This having been accomplished, crude phosphoric acid is sprayed, dripped, or otherwise admitted upon the upper portion of the coke, and allowed to flow upon the top of the body of coke, which is maintained, by the air blast, at about a white heat, i. e., at a temperature of 1200° C. to 1300° C. The gases from the furnace are removed advantageously by means of an exhaust fan and are advantageously cooled somewhat, and the phosphoric acid and phosphoric anhydride therein recovered by electric precipitation or other suitable means. In this manner it is readily possible to drive off and recover over 90% of the phosphoric acid contained in the crude phosphoric acid admitted into the furnace.

The amount of coke required per ton of acid depends upon various factors such as the degree of concentration of the crude phosphoric acid, size of furnace, quality of the coke and other factors. But the fuel consumption is very much less than required for the ordinary direct distillation process above mentioned. The slag and ash formed in the furnace do not affect the operation of the furnace, but are readily withdrawn at the bottom.

It is sometimes desirable to concentrate the phosphoric acid before introducing the same into the furnace or retort, in which the vaporization is to be effected. But it is also possible to admit the crude acid to the furnace without previous concentration, and to effect its concentration as well as volatilization therein. During concentration, preliminary to introduction into the retort or furnace, a considerable part of the arsenic, hydrofluoric acid as well as other volatile acids if present may be eliminated, and a large amount of the organic matter contained in the phosphoric acid may be charged and thereby rendered separable by the distillation. A portion of the mineral impurities may also be precipitated during this preliminary concentration operation and thereby gotten rid of. It is preferred in this concentration operation to concentrate the phosphoric acid up to a gravity of about 1.576 (about 53° Baumé), although it is to be understood that the invention is not restricted to the use of concentrated acid or to any particular concentration.

In a modified form of execution of the process, a retort, or a furnace of different type, can be substituted for the furnace filled with coke. The retort, or furnace, may be suitably heated either by the combustion of fuel or by electrical means, and the electrical means or means for the combustion of liquid or gaseous fuel may be located within the retort or furnace if desired. In all cases it is preferred to employ the exhauster between the retort or furnace and the condenser and to introduce sufficient air to insure oxidation of any phosphorus that may be formed.

When using the coke furnace or other apparatus, as above referred to, care must be taken to avoid reduction of phosphoric acid either to elemental phosphorus or to less highly oxidized compounds, and in order to avoid loss of phosphoric acid through this cause, it is advisable to introduce into the furnace an amount of air in excess of that used for burning the coke or other fuel so as to insure reoxidation of any reduced phosphorus formed. Air should likewise be introduced for this purpose when an electric furnace is used.

According to the temperature conditions, concentration, and other factors, there may be formed either ortho or meta phosphoric acid or a mixture of these with phosphoric anhydride.

A few impurities of which fluorine, lead and arsenic are the principal and typical examples, are not eliminated by the distillation step, but can be eliminated by the usual chemical treatment either before or after the distillation step. Thus the lead and arsenic may be removed by treatment of the crude or distilled product with hydrogen sulphide, or other suitable methods. Fluorine and the like may be removed by sufficient boiling of the crude or finished product or other suitable methods.

It will be understood that, instead of employing a condenser or an electric precipitator, a suitable absorption tower or other absorption device can be used for recovering the volatilized phosphoric acid and phosphoric anhydride, apparatus of this type being already well known in the art.

Reference has been above made to the use of coke as the fuel, for producing the high temperature. In other cases it may be more advisable to use fuel oil, gas, coal or other fuel, or to employ electricity, as the heating agent. The coke method, above described, has the advantage that it saves wear and tear on the furnace linings.

What is claimed is:

1. In the process of producing a purified phosphoric acid, the steps of heating an impure phosphoric acid to a temperature of at least 1200° C. in the presence of sufficient oxidizing gas to insure the absence of elemental phosphorus in the resulting fumes and recovering the phosphoric acid contained in the fumes.

2. In a process of producing a purified phosphoric acid or phosphoric anhydride; the steps which comprise applying a material containing a phosphoric acid to a bed of solid carbonaceous fuel having a temperature in excess of about 1200° C. in the presence of sufficient air to insure oxidation of any phosphorus that might be formed, and recovering the resulting phosphoric compounds from the fumes generated.

3. In a process of producing purified phosphoric acid, the steps of flowing impure phosphoric acid upon the upper part of a deep bed of solid fuel, maintained at a temperature in excess of about 1200° C. and in the presence of sufficient air to insure the oxidation of any reduced phosphorus, drawing off the resulting fumes and recovering the phosphoric acid contained in the fumes.

4. In a process of producing a purified phosphoric acid from impure phosphoric acid, the steps of heating such impure phosphoric acid at about atmospheric pressure and at temperatures in excess of about 1200° C. and in the presence of a current of gas of sufficient oxidizing capacity to insure the absence of elemental phosphorus in the resulting fumes and recovering the phosphoric acid contained in the fumes.

5. The process of producing a purified phosphoric acid from crude ortho phosphoric acid obtained by treating phosphatic material with sulphuric acid, comprising concentrating the crude acid by boiling and thereby removing impurities volatile below the boiling temperature, heating the concentrated acid to a white heat, drawing off the resulting fumes and recovering a phosphoric acid therefrom.

6. The process of producing a purified phosphoric acid from crude ortho phosphoric acid obtained by treating phosphatic material with sulphuric acid, which comprises running the crude phosphoric acid onto a bed of coke maintained at about a white heat by an air blast, maintaining sufficient air in the heating zone to insure the absence of elemental phosphorus in the resulting fumes, removing the fumes and products of combustion from the furnace by suction and recovering phosphoric acid therefrom by electric precipitation.

7. In a process of producing a purified phosphoric acid, from impure phosphoric acids, the step of heating the impure acid to a temperature of about 1200° C. under conditions insuring the absence of elemental phosphorus in the resulting fumes.

8. In a process of producing a purified phosphoric acid or phosphoric anhydride, the steps which comprise applying an impure phosphoric acid to a bed of solid carbonaceous fuel, heating it sufficiently thereon by burning the fuel to produce fumes containing meta phosphoric acid, sufficient air being present to insure the absence of elemental phosphorus, and recovering the resulting phosphoric compounds from said fumes.

9. In the process of purifying phosphoric acid, the steps which comprise introducing crude phosphoric acid in small quantities at a time onto a highly heated deep bed of coke or carbon maintained at a high temperature by an air-blast, oxidizing the phosphorus produced and recovering the resulting phosphoric compounds from the fumes produced.

10. In the process of producing purified phosphoric acid from crude phosphoric acid obtained by treating phosphatic material with sulphuric acid, the steps which comprise running the crude phoshoric acid onto a bed of coke or carbon maintained at a high temperature by an air blast, oxidizing the phosphorus produced, and recovering the phosphoric compounds from the resulting fumes.

In testimony whereof we have signed our names to this specification.

PHILIP C. HOFFMANN.
JOHN MAXWELL.
CLARENCE E. McCOY.